Sept. 2, 1941.  D. D. CLYBURN  2,254,675
CULTIVATOR DISTRIBUTOR ATTACHMENT
Filed Oct. 24, 1939
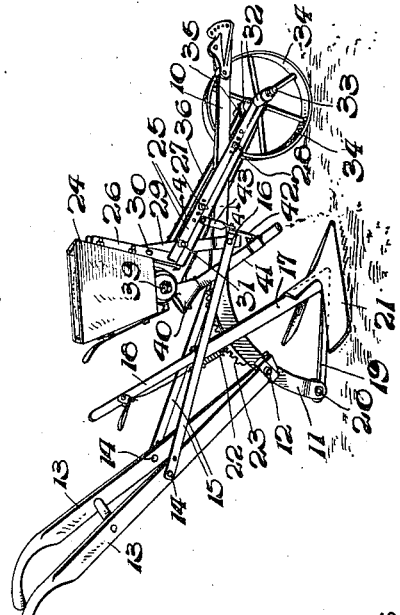
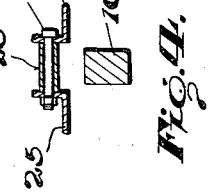
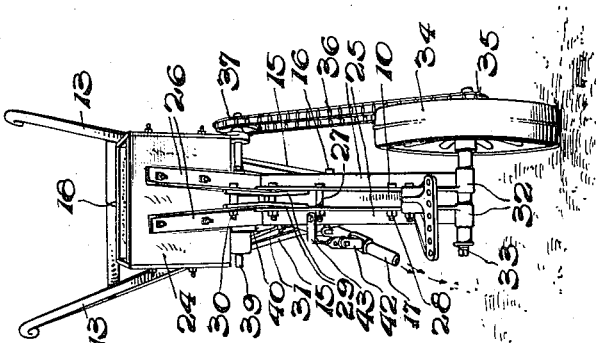
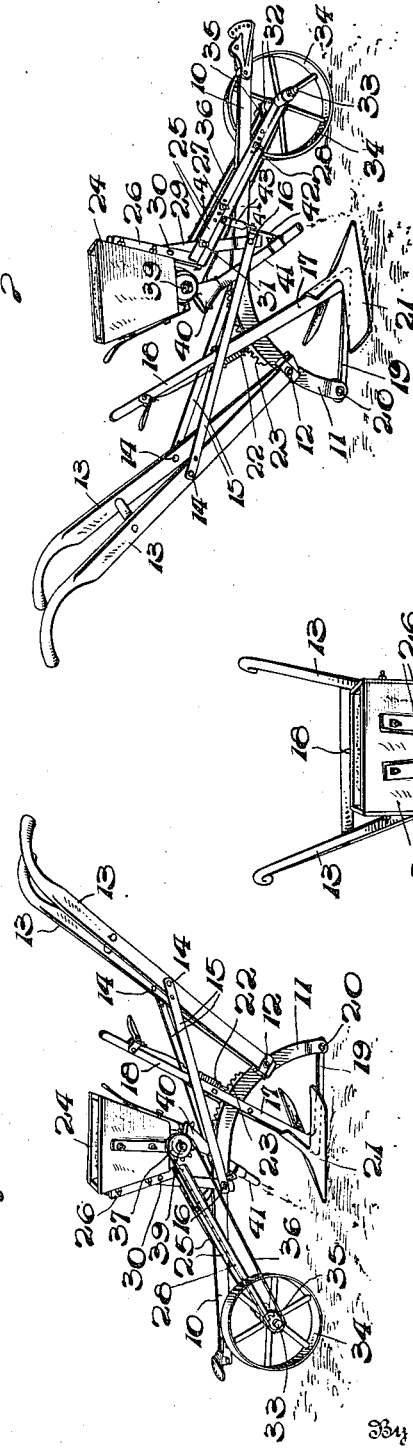
Inventor
David D. Clyburn.
By
Attorney Patented Sept. 2, 1941

2,254,675

UNITED STATES PATENT OFFICE 2,254,675

CULTIVATOR DISTRIBUTOR ATTACHMENT

David D. Clyburn, Bethune, S. C.

Application October 24, 1939, Serial No. 301,042

4 Claims. (Cl. 111—64)

My invention relates to a distributor for soda, fertilizer, or the like.

An important object of the invention is to provide a distributor of the above mentioned character, which is in the nature of an attachment, and may be readily applied to and removed from a conventional cultivator without in any way permanently altering the construction of the cultivator.

A further object of the invention is to provide a distributor of the above mentioned character which may be mounted upon the cultivator and will in no way interfere with the operation of the cultivator, so that the soda or fertilizer may be applied as a side dressing to the crop, while cultivating the crop.

A further object of the invention is to provide a distributor attachment of the above mentioned character, which is vertically movable with respect to the beam of the cultivator, so that the traction wheel of the attachment may properly follow the ground.

A further object of the invention is to provide a distributor of the above mentioned character having an outlet spout and which is flexible and adjustable.

Other objects and advantages of the invention will be apparent during the course of the following description.

In the accompanying drawing forming a part of this application and in which like numerals are employed to designate like parts throughout the same, Figure 1 is a perspective view of the distributor attachment embodying my invention, as applied to a cultivator, viewed from one side of the cultivator, Figure 2 is a similar view, viewed from the opposite side of the cultivator, Figure 3 is a similar view, viewed from the front end of the cultivator, and, Figure 4 is a transverse section through the beams of the attachment and the cultivator beam, taken on line 4—4 of Figure 2, parts omitted.

In the drawing, wherein for the purpose of illustration is shown a preferred embodiment of my invention, the numeral 10 designates the beam of a cultivator, the rear end of which is bent downwardly to provide a downwardly inclined portion 11. Secured to the downwardly inclined portion 11 at 12, are rearwardly extending handles 13, which are connected at 14 with forwardly converging straps 15. These straps 15 have their forward ends apertured to receive a common bolt 16, passing through an opening in the beam 10. The cultivator comprises a stock 17, having an upwardly extending handle 18, rigidly secured thereto. This stock has an opening for the inclined curved portion 11 of the plow beam. The lower end of the stock 17 is connected with a horizontal bar 19, extending rearwardly and pivotally connected at 20, with the downwardly inclined portion 11. Secured to the lower end of the stock is a cultivator share 21. The stock is angularly adjusted by manipulation of the lever 18 and may be locked in a selected adjusted position by a latch 22 engaging a stationary quadrant 23. The foregoing description is that of the conventional cultivator.

My distributor attachment comprises a hopper 24, arranged above the beam 10. Arranged in advance of the hopper 24 is a pair of spaced inclined bars 25, having upwardly extended portions 26, arranged generally at a right angle thereto. The upwardly extended portions 26 are rigidly secured to the front face of the hopper 24 and the bars 25 are vertically inclined and extend downwardly below the beam 10. The bars 25 are arranged upon opposite sides of the beam 10 and are connected by bolts 27 and 28, carrying spacing sleeves 28', and the bolts 27 and 28 are arranged above and below the beam 10, and vertically spaced therefrom. The bars 25 have spaced openings 29', to receive the bolts 27 and 28, so that the bolts may be adjusted with respect to the cultivator beam. The numeral 29 designates a pair of generally vertical support bars, arranged between the upwardly extended portions 26 and bolted thereto at 30 and also arranged between the rear ends of the inclined bars 25 and bolted thereto at 31. The lower ends of the bars 29 diverge slightly so that they are adapted to be arranged upon opposite sides of the beam 10, and these lower ends are apertured. The bolt 16 is removed when the bars 29 are applied to the beam 10 and this bolt is again placed in position and passes through the openings in the straps 15, bars 29, and beam 10, and serves to connect all of these parts. The bolt 16 serves to pivotally mount the bars 29 upon the beam 10, so that the supporting unit including the bars 25 and bars 29, swing in a vertical plane longitudinally of the beam 10, and in relation thereto.

Secured to the forward ends of the bars 25 are bearings 32 receiving a shaft or axle 33, upon which a traction wheel 34 is mounted. The axle 33 is preferably rotatable within the bearings 32 and the traction wheel 34 fixed to the axle, but the axle may be held stationary, and the traction wheel rendered rotatable upon the axle. A sprocket wheel 35 is rotatable with the traction wheel and this sprocket wheel engages a sprocket chain 36 engaging a sprocket wheel 37.

The hopper 24 is provided with any suitable form of means for discharging the soda or fertilizer from the same, in regulated amounts, including a rotary feeder (not shown), driven by a horizontal shaft 39, carrying the sprocket wheel 37 and rotated thereby. The shaft 39 is journaled in suitable bearings secured to the hopper 24. The usual adjustable means may be employed to regulate the amount of material discharged by the feeder. The discharge means feeds the material into a receptacle 40, suspended from the hopper. This receptacle has a depending flexible spout 41, having connection with a strap 42, angularly adjustably connected with a bracket 43, secured to the adjacent bar 25. This flexible spout may be adjusted laterally or raised and lowered and held in the adjusted position. The invention is in no sense restricted to any precise form of means for feeding solid material from the hopper as any suitable type of feeder may be employed. I may employ the type of feeder shown in the Sparks patent 771,104, if desired.

With the attachment applied to the cultivator, the cultivator is drawn forwardly longitudinally of the row and the cultivator share 21 cultivates the crop, while the traction wheel 34 is rotated by engagement with the ground and operates the feeding means of the hopper 24, causing the soda or fertilizer to discharge in regulated amounts through the spout 11 and be deposited upon the ground in advance of the cultivator share. The application of the soda or fertilizer is in the nature of a side dressing to the crop during the cultivation of the crop. Since the supporting unit including the bars 25 and bars 29 can swing vertically with relation to the beam 10, the traction wheel 34 will remain in contact with the ground, while the beam 10 may rise and fall with respect to the ground, during the cultivating operation.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. A distributor attachment to be applied to a cultivator including a beam and a transverse bolt carried by the beam, said attachment comprising a pair of spaced inclined bars to be arranged upon opposite sides of the beam and extending above and below the beam, means to connect the bars, generally vertical bars connected with the upper ends of the inclined bars and extending downwardly below the same and arranged upon opposite sides of the beam and provided near their lower ends with openings to receive the bolt of the cultivator beam, a hopper mounted upon the upper ends of the inclined bars, feed means connected with the hopper to discharge solid material from the same, a spout receiving the solid material from the feed means, a shaft carried by the lower ends of the inclined bars, a traction wheel secured to the shaft, and driving connecting means between the traction wheel and the feed means.

2. A distributor attachment to be applied to a cultivator including a beam and a transverse bolt carried by the beam, said attachment comprising an inclined bar provided at its upper end with a generally vertical extension arranged at an angle to the inclined bar, the inclined bar being arranged upon one side of the beam and extending above and below the same, a generally vertical bar connected with the upper portion of the inclined bar and the generally vertical extension and projecting downwardly below the inclined bar and having an opening at its lower end to receive the bolt of the beam, a hopper mounted upon the generally vertical extension, feed means connected with the hopper to discharge solid material therefrom, a spout to receive the solid material from the feed means, a traction wheel secured to the lower end of the inclined bar and driving connecting means between the traction wheel and the feed means.

3. A distributor attachment to be applied to a cultivator having a beam, handles secured to the rear portion of the beam, straps secured to the handles and extending forwardly therefrom, and a transverse bolt carried by the beam in advance of the handles and serving to secure the straps to the beam, said attachment comprising an inclined supporting unit arranged adjacent to the beam and forwardly of the handles and extending downwardly in a forward direction, the inclined supporting unit extending above and below the beam, a generally vertical bar attached to the upper rear portion of the supporting unit and having an opening at its lower end to receive the bolt carried by the beam, a hopper mounted upon the rear end of the supporting unit, feed means connected with the hopper to discharge solid material therefrom, a spout to receive solid material from the feed means, a traction wheel arranged near the forward end of the beam and mounted upon the lower forward end of the supporting unit, and driving connecting means between the traction wheel and the feed means, the arrangement being such that the traction wheel and feed means have the distance between them constant during the swinging movement of the supporting unit so that the operation of the driving connecting means is not impaired.

4. A distributor attachment to be applied to a cultivator, said attachment comprising a supporting unit arranged adjacent to the beam and extending above and below the beam, said supporting unit including an upper portion and a lower portion, the upper portion extending generally transversely of the lower portion, a generally vertical support bar attached to the upper portion and lower portions of the supporting unit and extending downwardly, means to pivotally mount the generally vertically support bar upon the beam so that the supporting unit can swing vertically with respect to the beam, a hopper mounted upon the upper end of the supporting unit, feed means connected with the hopper to discharge solid material therefrom, a spout to receive solid material from the feed means, a wheel arranged near the forward end of the beam and mounted upon the lower end of the supporting unit, and driving connecting means between the wheel and the feed means, the arrangement being such that the wheel and feed means have the distance between them remaining constant upon the swinging of the supporting unit whereby the operation of the driving connecting means is not impaired.

DAVID D. CLYBURN.